D. H. TEAS AND A. WOOD.
JOURNAL TURNING AND BURNISHING, QUARTERING, AND CRANK PIN TURNING MACHINE.
APPLICATION FILED MAY 8, 1919.

1,370,715.

Patented Mar. 8, 1921

D. H. TEAS AND A. WOOD.
JOURNAL TURNING AND BURNISHING, QUARTERING, AND CRANK PIN TURNING MACHINE.
APPLICATION FILED MAY 8, 1919.

1,370,715.

Patented Mar. 8, 1921.
5 SHEETS—SHEET 3.

INVENTOR
Daniel H. Teas
BY Augustus Wood
S Jay Teller
ATTORNEY D. H. TEAS AND A. WOOD.
JOURNAL TURNING AND BURNISHING, QUARTERING, AND CRANK PIN TURNING MACHINE.
APPLICATION FILED MAY 8, 1919.

1,370,715.

Patented Mar. 8, 1921
5 SHEETS—SHEET 4.

UNITED STATES PATENT OFFICE.

DANIEL H. TEAS, OF CHICAGO, ILLINOIS, AND AUGUSTUS WOOD, OF HAMILTON, OHIO, ASSIGNORS TO NILES-BEMENT-POND COMPANY, OF NEW YORK, N. Y., A CORPORATION OF NEW JERSEY.

JOURNAL TURNING AND BURNISHING, QUARTERING, AND CRANK-PIN-TURNING MACHINE.

1,370,715.

Specification of Letters Patent.   Patented Mar. 8, 1921.

Application filed May 8, 1919. Serial No. 295,801.

*To all whom it may concern:*

Be it known that we, DANIEL H. TEAS and AUGUSTUS WOOD, citizens of the United States, residing, respectively, at Chicago, in the county of Cook and State of Illinois, and Hamilton, in the county of Butler and State of Ohio, have invented certain new and useful Improvements in Journal Turning and Burnishing, Quartering, and Crank-Pin-Turning Machines, of which the following is a specification.

This invention relates to a machine which can be optionally used for turning or burnishing the inside or the outside journals of locomotive or car axles, while the wheels are in place thereon; or which can be used for quartering the wheels while in place on the axles, that is, for boring the holes in the respective wheels for the crank pins 90° apart, with either a right-hand or a left-hand lead; or which can be used for turning crank pins while in place. One object of the invention, therefore, is to provide a combined machine adapted for the uses specified. Further objects of the invention are to provide certain improved features of construction whereby the machine can be readily transformed or adjusted for the different kinds of work. Still further objects of the invention will be apparent from the following specification and claims.

In the accompanying drawings we have shown the embodiment of the invention which we now deem preferable, but it will be understood that the drawings are for illustrative purposes only and are not to be construed as defining or limiting the scope of the invention, the accompanying claims being relied upon for that purpose.

Of the drawings:

Fig. 4 is a right end view.

Figs. 1 to 6 show the machine adjusted for turning the inside journals of locomotive driving or pony axles having the wheels in place thereon. As illustrated, 1 represents the bed of the machine and 2 and 3 represent respectively the headstock and tailstock which are longitudinally adjustable along the bed. An adjusting mechanism for the headstock is shown at 4, and a similar adjusting mechanism for the tailstock is shown at 5.

Figure 2:
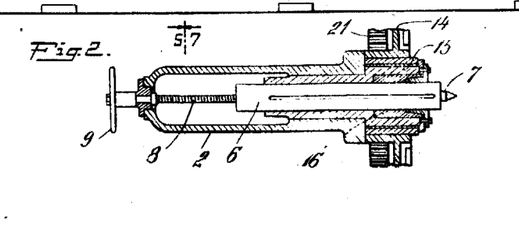
Fig. 2 is a fragmentary vertical longitudinal sectional view through the headstock.

A spindle 6, which is preferably non-rotatable, is longitudinally adjustably mounted in the headstock. This spindle carries a center 7. As shown in Fig. 2, there is provided for adjusting the spindle a screw 8 and a hand wheel 9. The tailstock 3 is provided with a longitudinally adjustable spindle 10 carrying a center 11. For adjusting the spindle there is provided a screw 12 and a hand wheel 13. When the machine is to be used for turning the inside journals of a locomotive axle, the axle with the wheels in place thereon is mounted on the centers 7 and 11 in the usual way.

For rotating the wheel and axle and for other purposes, there is provided a face plate 14 which is preferably mounted on a non-rotatable bearing support 15 concentric with the spindle 6. The bearing support is preferably recessed, and as shown in Fig. 2, a bushing 16 is fitted in the recess to form a supplemental support for the spindle 6. For rotating the face plate there is provided a power mechanism which preferably comprises an electric motor 17 carried by a bracket on the headstock. By means of suitable gearing 18 power is transmitted from the motor to a longitudinal shaft 19 at the front of the headstock. The shaft 19 is provided at its inner or right-hand end with a pinion 20 which meshes with an internal gear 21 secured to the face plate. The face plate is provided with suitable means for turning the wheels and axle, and for spoked wheels, this means consists of a dog 22, illustrated in Figs. 1 and 7, which is adapted to project between two spokes of one of the wheels. A suitable clamp may be provided for connecting the dog with one of the spokes. The face plate is provided with the usual radial T-slots and one of these can be utilized for holding the dog 22 in place. For wheels without spokes use may be made of the devices shown in Figs. 8 and 9 and hereinafter described. Preferably the face plate is provided with a recess 22ª which is adapted to receive the crank pin of the adjacent wheel, when a locomotive driving wheel axle is being turned. It will be seen that by means of the several parts described, the wheels and axle can be rotated on the centers 7 and 11.

As is well known, locomotive drive wheels are ordinarily provided with counterweights to compensate for the centrifugal action of the crank pins and of the connecting rods when the locomotive is in use. When the wheels and axle are detached from the locomotive and mounted on the lathe centers, they are considerably out of balance by reason of the excess sizes of the counterweights. This lack of balance would be objectionable in the operation of the lathe, and to compensate for it and restore the combined rotating parts to a balanced relation, we provide a suitable counterweight 23 which is secured to or at least adapted to be secured to the face plate 14.

Figures 2, 3, 5, 7:
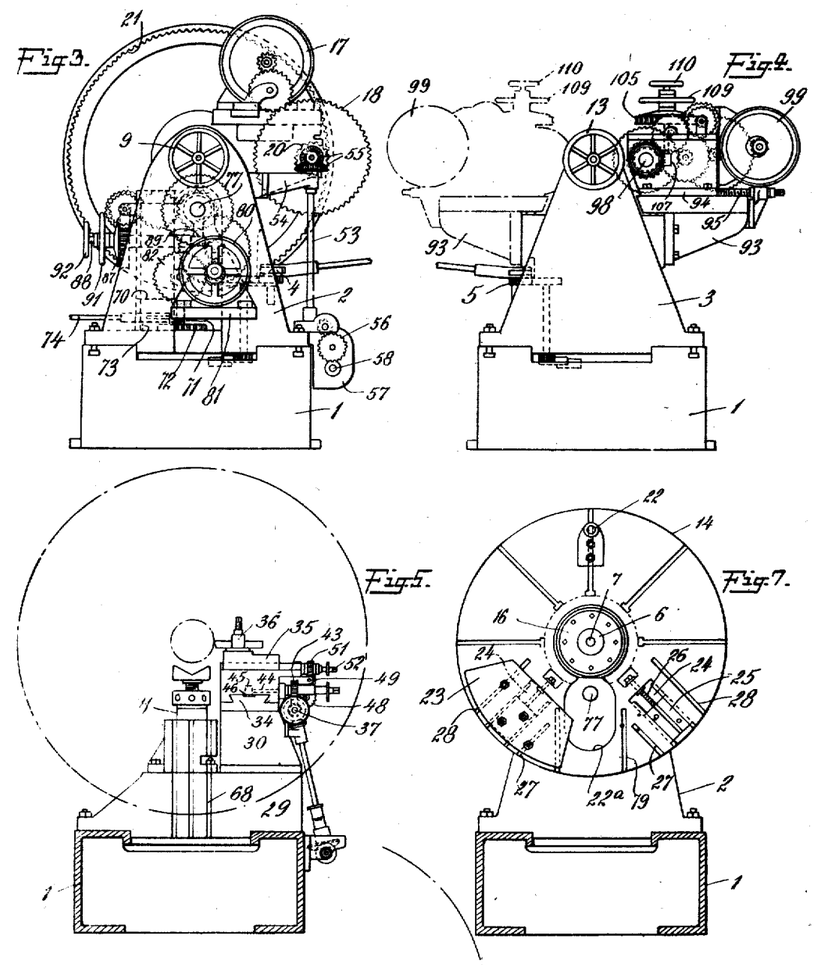
Fig. 3 is a left end view.
Fig. 5 is a transverse sectional view taken along the line 5—7 of Fig. 1 and looking toward the right.
Fig. 7 is a transverse sectional view taken along the line 5—7 of Fig. 1 and looking toward the left.
Figure 6:
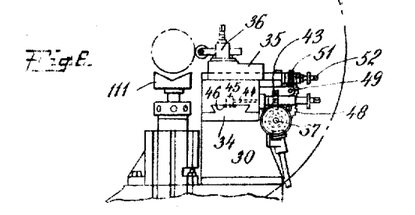
Fig. 6 is a fragmentary view similar to Fig. 5 showing a burnishing tool in place.

As illustrated particularly in Fig. 7, the face plate is provided with at least one and preferably two radial recesses 24 having parallel walls adapted to serve as guideways. These recesses 24, 24 are located at opposite sides of the aforesaid recesses 22ª. The recesses 24, 24 are 90° apart and are each 45° from the recess 22ª. Mounted in each recess is a slide 25 which is radially adjustable under the control of a screw 26. To either of the slides 25 may be secured a counterweight 23, and by adjusting the slide the counterweight may be moved either inward or outward, as required, to effect the desired balance. Preferably the counterweight 23 consists of a number of sections as shown, it being thus adjustable for locomotive wheels of different sizes. Preferably T-slots 27, 27 and 28, 28 are provided at the sides of the recesses 24, 24, and these slots may be used for additionally connecting the weight to the face plate. When the wheels and axle are in place, as shown, with one crank pin projecting into the recess 22ª, the corresponding counterweight will be diametrically opposite the recess. The counterweight for the other wheel will be at 90° from the first said counterweight and from the recess. The two counterweights on the wheels, therefore, can be balanced by a single counterweight on the face plate at 45° from the said recess 22ª. As stated, the aforesaid counterweight 23 can be secured to the face plate at either side of the recess, thus adapting the machine for differently arranged counterweights on the wheels, such for instance as would be found with wheels having right-hand or left-hand leads.

Carried by the bed of the machine is a support 29 adapted to carry brackets 30 and 31 for tool carriages 32 and 33. As shown in Fig. 5, each bracket 30 and 31 is provided with a longitudinal guideway 34 and the guideways of the two brackets are in register, thus forming a continuous guideway along the top. The tool carriages 32 and 33 are adapted to move along the combined guideway 34, and each carriage includes a transverse slide 35 carrying a suitable holder 36 for the cutting tool or for the burnishing tool. A cutting tool is shown in Fig. 5 and a burnishing tool in Fig. 6, and it will be understood that when we herein refer to turning we mean to include either cutting or burnishing.

For moving the carriages 32 and 33 longitudinally along the guideway 34, there is provided a longitudinal shaft 37. This shaft has a bearing 38 secured to the bracket 30 near the left-hand end thereof and a bearing 39 secured to the bracket 31 near the right-hand end thereof. The tool carriages 32 and 33 are provided respectively with sleeves 40 and 41 adapted to receive the shaft 37 and to have splined engagement therewith. Mounted on each sleeve is a worm 42 meshing with a worm wheel 43 adapted to be clutched to a transverse shaft 44. The shaft 44 carries a pinion 45 which meshes with a rack 46 on the guideway 34. It will thus be seen that when the shaft 37 is turned, power may be transmitted to rotate the pinion 45 and thus move the corresponding carriage longitudinally.

Each sleeve 40 or 41 also carries a pinion 47 meshing with change-gearing 48 connecting with a longitudinal shaft 49 carrying a worm 50. The worm 50 meshes with a worm wheel 51 on a transverse threaded shaft 52 which controls the movement of the tool slide 35. It will thus be seen that when the shaft 37 is rotated the tool slide can be moved inward or outward by means of the mechanism described in order to face the inner nubs of the wheels.

The shaft 37 is preferably driven from the main drive motor, the mechanism provided for the purpose being as follows: Near the outer left-hand end of the headstock is a substantially vertical shaft 53 supported by a bearing bracket 54. This shaft is connected with the shaft 19 by means of bevel gearing 55. By means of suitable worm and spur gearing 56, the shaft 54 is connected with the drive shaft of a suitable change-speed mechanism 57. This mechanism has splined engagement with a longitudinal feed shaft 58. An inclined shaft 59 is connected with the shaft 58 by means of bevel gearing 60, and this shaft 59 is connected with the aforesaid shaft 37 by means of bevel gearing 61. Preferably a readily separable joint 62 is provided between the shaft 59 and the driven element of the gearing 60. At the right-hand end of the shaft 58 there is provided other bevel gearing 63 similar to the bevel gearing 60. Associated with this bevel gearing is an element 64 similar to the driven element of the aforesaid joint 62. It will be seen that when the parts are connected, as shown, the tool carriages 32 and 33 can be moved to feed the cutting tools or the burnishing tools longitudinally along the inside journals of the axle. If desired, the transverse slides 35 can be moved to feed the tools inward or outward. The rate of feed can be adjusted by means of the change-speed mechanism 57.

Figure 8:
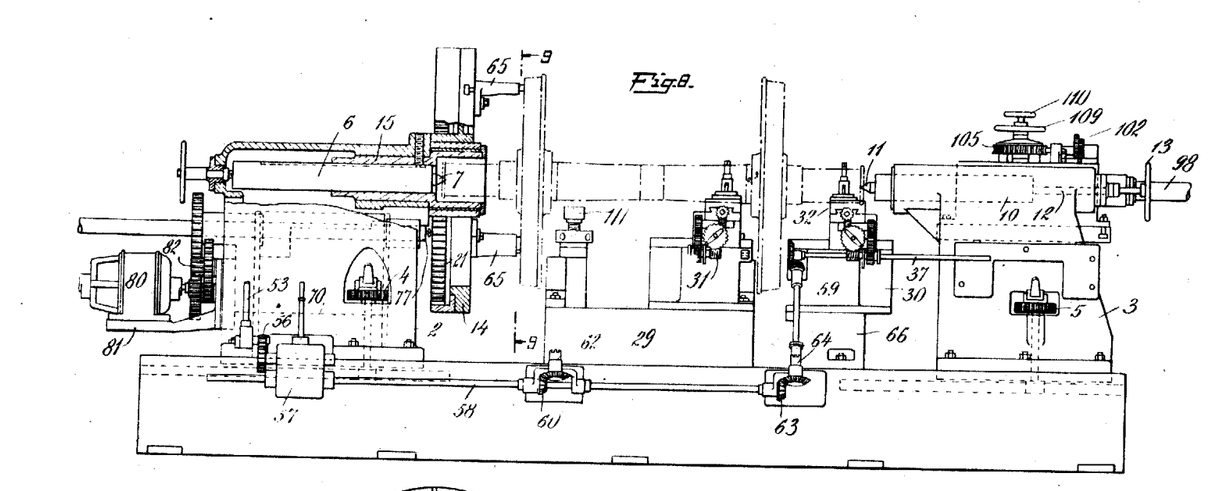
Fig. 8 is a view similar to Fig. 1, the machine, however, being adjusted for turning the outside journals of locomotive trailer wheel axles or car wheel axles.
Figure 9:
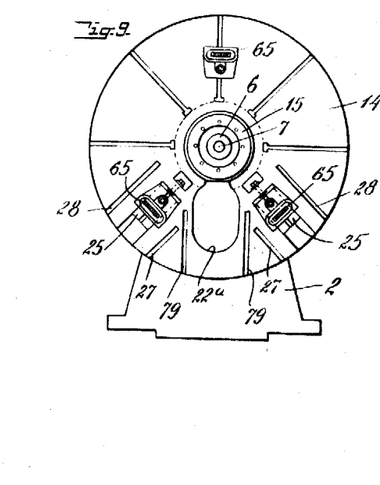
Fig. 9 is a transverse sectional view taken along the line 9—9 of Fig. 8, looking toward the left.

Figs. 8 and 9 show the machine adjusted for turning or burnishing the outside journals of locomotive trailer or car axles. The two centers 7 and 11 are separated in accordance with the increased length of axle. The tailstock 2 is preferably bodily moved toward the right and the headstock is moved temporarily toward the left to permit the axle to be put in place. The aforesaid sleeve 16 is removed from the bearing support 15 and the headstock is moved so that the left-hand end of the axle is positioned in the recess in the support, the spindle 6 with the center 7 being withdrawn to the position shown.

Figure 1:
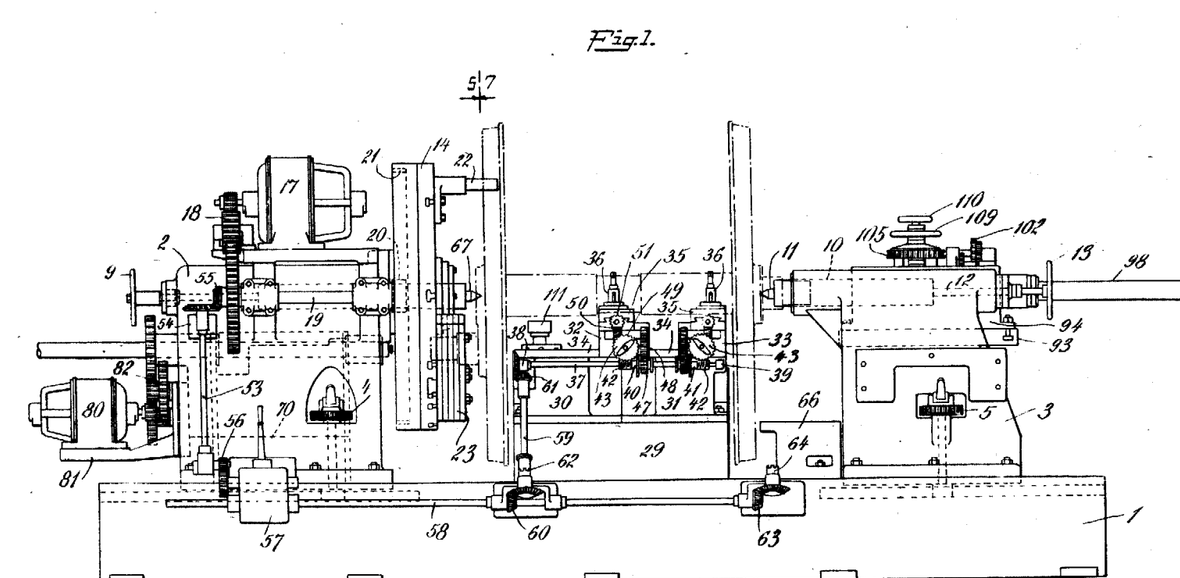
Figure 1 is a front view of a machine embodying the invention, the machine being adjusted for turning the inside journals of locomotive axles.

Wheels such as shown are not provided with counterweights, and therefore the aforesaid counterweight 23 on the face plate 14 is removed. When the wheels are provided with spokes a dog such as 22 may be used for rotating them, as shown in Fig. 1. When the wheels are not provided with spokes we preferably provide three toothed dogs 65, 65, 65 adapted to engage the outer surface of the left-hand wheel. Two of these dogs may conveniently be mounted on the aforesaid slides 25, 25, which are adapted to carry the counterweight, and the third may be held in place on the face plate by means of one of the regular radial T-slots thereof. It will be seen that the positioning of the end of the axle in the recess in the bearing support 15 makes it possible to make the dogs 65, 65, 65 relatively short.

The machine is provided with a supplemental support 66 which is similar to the support 29 but shorter. For turning or burnishing outside journals the left-hand bracket 30 is removed from the support 29 and placed on the support 66, as illustrated in Fig. 8. The shaft 59 is connected with the driven element 64, being thus rotated through the bevel gearing 63. It will be seen that the supplemental support 66 is so located as to bring the tool carriage 32 into position to permit the turning of the outside journal. With the parts thus readjusted the general operation of the machine is the same as that before described. It will be understood that the two outside journals cannot be turned or burnished simultaneously but that after one of them has been completed the axle must be turned end for end in order to position the second journal for turning or burnishing.

For quartering, the machine is adjusted as shown in Figs. 10 to 13. The wheels to be quartered are mounted in the usual way on the centers. In accordance with the preferred embodiment of the invention, as illustrated, the wheels are so adjusted that the position of the desired crank pin hole in the left-hand wheel is vertically below the wheel axis, the desired position of the crank pin hole in the right-hand wheel therefore being at the same horizontal plane as the axis. The wheels are suitably clamped against rotation as, for instance, by means of clamping bolts 67 engaging T-slots 68 in the support 29 or in a supplemental bracket secured thereto.

Figure 10:
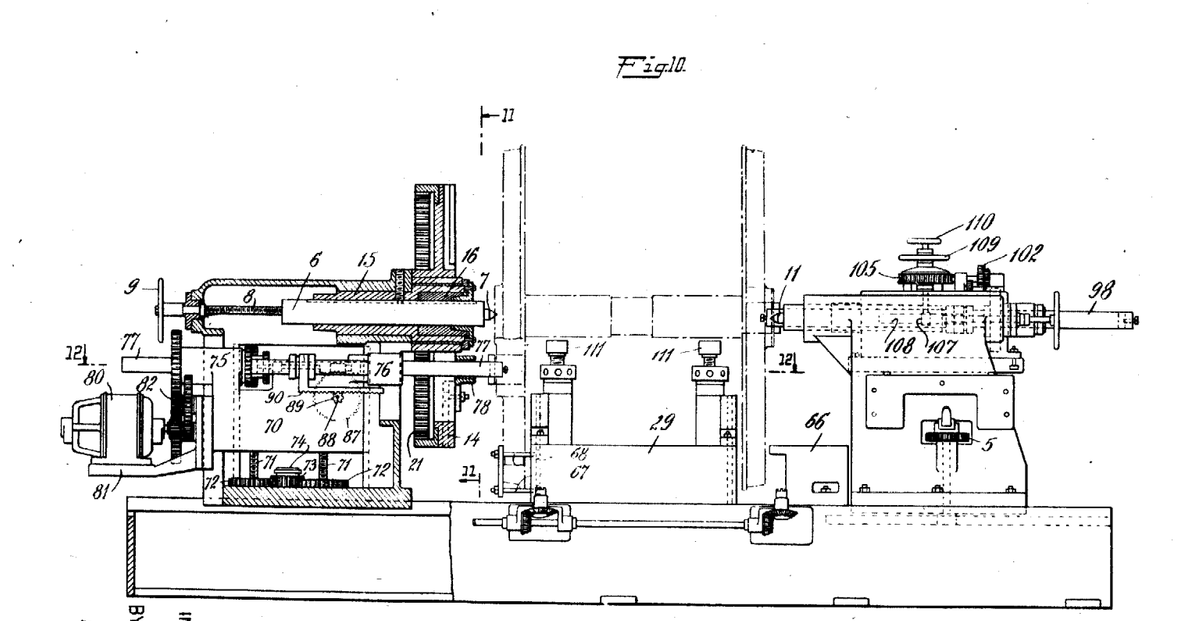
Fig. 10 is a view somewhat similar to Figs. 1 and 7 but with certain parts shown in section. In this view the machine is adjusted for quartering locomotive wheels.
Figure 11:
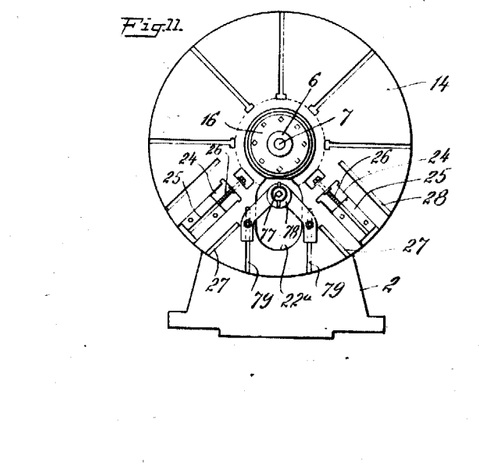
Fig. 11 is a transverse sectional view taken along the line 11—11 of Fig. 10, looking toward the left.
Figure 12:
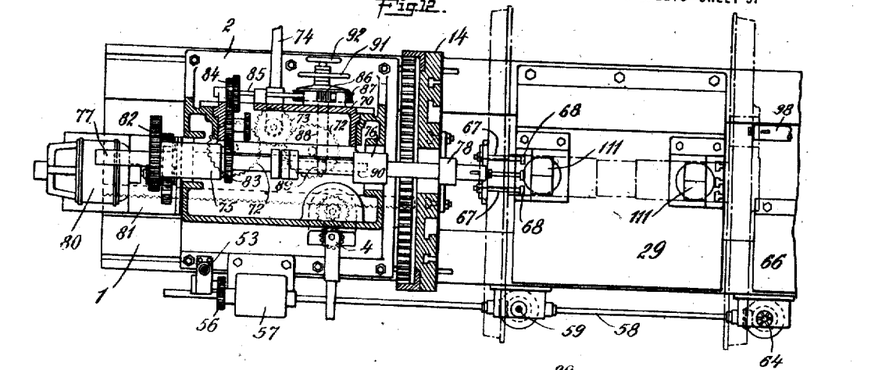
Fig. 12 is a fragmentary horizontal sectional view taken along the line 12—12 of Fig. 10.

The headstock is provided with a vertically adjustable slide 70 which can be moved by means of screws 71, 71 under the control of gears 72, 72 and 73, the latter gear being adapted to be turned by means of a ratchet lever 74. Mounted in bearings 75 and 76 on the slide 70 is a longitudinally adjustable rotatable spindle 77. This spindle is adapted to carry at its right-hand forward end a boring tool which can be set to bore a hole of the desired diameter in the adjacent wheel. It will be seen that the hole can be bored at any desired distance from the axis by raising or lowering the spindle by means of the slide 70 and the screws 71, 71. Preferably a supplemental bearing 78 is provided for the spindle 77, this bearing being secured to the face plate 14, as illustrated in Figs. 10 and 11. This bearing is positioned at the recess 22ª and is held in place by means of bolts entering T-slots 79, 79 in the face plate, and it will be clear that the bearing can be adjusted vertically in accordance with the vertical adjustment of the spindle.

For rotating the spindle 77 we preferably provide a separate electric motor 80 carried by a bracket 81 secured to the slide 70. A train of gearing 82 connects the motor with the spindle, the final element of this gear train being splined on the spindle so as to permit longitudinal movement thereof. Suitable mechanism is provided for feeding the spindle longitudinally. As illustrated, this mechanism includes a gear 83 splined on the spindle, and change-gearing 84 interposed between the gear 83 and a longitudinal feed shaft 85. The shaft 85 carries a worm 86 which meshes with a worm wheel 87 on a transverse shaft 88. The transverse shaft 88 carries a pinion 89 which meshes with a rack 90, this rack being connected with the spindle so as to move it longitudinally. It will be seen that when the spindle is rotated, power is transmitted through the mechanism described to move the rack longitudinally and thus move the spindle. Preferably the worm wheel 87 is connected with the shaft 88 by means of a clutch controlled by a hand wheel 91. By releasing this clutch the shaft 88 can be turned manually by means of a hand wheel 92 to move the spindle longitudinally.

Secured to the tailstock is a bracket 93 upon which is mounted the boring mechanism for the right-hand wheel. As illustrated by full lines in Figs. 4, 10 and 13, this mechanism is positioned at the rear side of the tailstock. The bracket 93 is provided with a horizontal guideway on which is adjustably mounted a slide 94, this slide being adjustable by means of a screw 95. Mounted in bearings 96 and 97 on the slide 94 is a longitudinally adjustable spindle 98. The spindle is adapted to carry at its left-hand forward end a boring tool which can be set to bore a hole of the desired diameter in the adjacent wheel. It will be seen that the hole can be bored at any desired distance from the axis by moving the spindle forward or backward by means of the slide 94 and the screw 95.

For rotating the spindle 98 we preferably provide a separate electric motor 99 carried by the slide 94. A train of gearing 100 connects the motor with the spindle, the final element of this gear train being splined on the spindle so as to permit longitudinal movement thereof. Suitable mechanism is provided for feeding the spindle longitudinally. As illustrated, this mechanism includes a gear 101 splined on the spindle and change-gearing 102 interposed between the gear 101 and a longitudinal feed shaft 103. The shaft 103 carries a worm 104 which meshes with a worm wheel 105 on a vertical shaft 106. The vertical shaft 106 carries a pinion 107 which meshes with a rack 108, this rack being connected with the spindle so as to move it longitudinally. It will be seen that when the spindle is rotated, power may be transmitted through the mechanism described to move the rack longitudinally and thus move the spindle. Preferably the worm wheel 105 is connected with the shaft 106 by means of a clutch controlled by a hand wheel 109. By releasing this clutch the shaft 106 can be turned manually by means of a hand wheel 110 to move the spindle longitudinally.

By means of the two boring spindles 77 and 98 together with the supporting and driving mechanisms therefor, it is possible to bore crank pin holes in the two wheels simultaneously at 90° apart.

Figure 13:
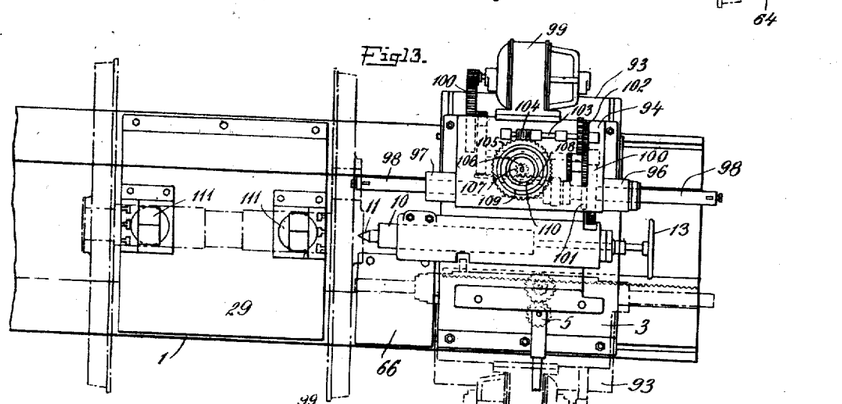
Fig. 13 is a fragmentary plan view of the right-hand end of the machine, as shown in Fig. 10.

In order that the machine may be adapted for boring crank pin holes with either a right-hand lead or a left-hand lead, we preferably make the tailstock mechanism movable so that it can be positioned either as shown by full lines in Figs. 4 and 13 or as shown by dotted lines in the said figures. The bracket 93, together with all of the parts carried thereby, can be removed from the rear side of the tailstock, turned end for end and secured to the front side of the tailstock. This requires no adjustment or change of any part of the boring mechanism except the removal of the boring tool from one end of the spindle to the other. The operation of the boring mechanism in the dotted line position is substantially the same as that already described, and repetition of the description is unnecessary. The only difference in the operation is that the motor 99 is operated in the other direction in order to properly turn the spindle 98 and to effect the feed thereof in the forward direction.

Figure 14:
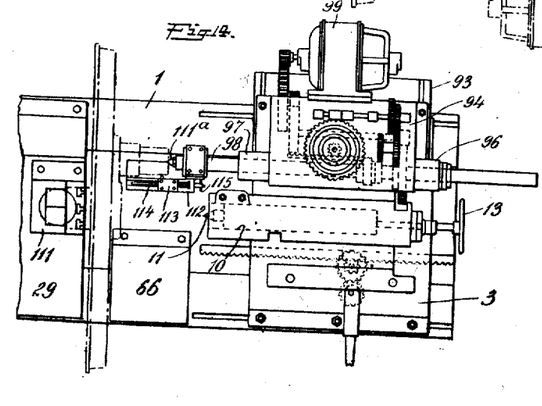
Fig. 14 is a fragmentary plan view similar to Fig. 13, but showing the machine adjusted for turning crank pins.
Figure 15:
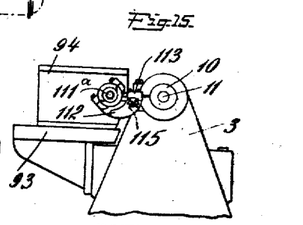
Fig. 15 is a detailed end view of the crank pin turning device.

For turning crank pins in place, use may be made of the spindle 98 and the associated parts, these preferably being located in the position shown by full lines in Figs. 4 and 13. The wheels and axle together with the crank pins may be mounted in the usual way on the centers. Frequently, however, the centers and the spindles therefor interfere with the turning. We therefore provide jacks 111 which may be used to support the axle and wheels thus permitting the centers and spindles to be withdrawn. Supplemental centers 111ª are mounted in the spindles 98 and 77 and these are engaged with the crank pin to be turned. For turning crank pins one or more supplemental turning mechanisms are utilized, as illustrated in Figs. 14 and 15. Each mechanism consists of a tool carrier 112 which is adapted to be clamped to the spindle 98 or to the spindle 77. This carrier includes a longitudinal guideway along which a tool holder 113 is movable. This tool holder is controlled by means of a screw 114 carrying a star feed wheel 115. In operation, a suitable tool is secured to the holder 113 and the spindle is rotated, without however, being fed longitudinally. In this way the carrier 112 together with the tool holder 113 and the tool are bodily revolved about the crank pin. The tool is fed by means of a screw 114 and the star wheel 115, the wheel engaging a suitable abutment at each revolution. By providing two turning mechanisms such as shown it is possible to turn both pins at the same time.

From the foregoing description it will be seen that we have provided a machine which is readily capable of use for turning or burnishing either inside or outside journals, or for quartering, or for crank pin turning, and that the machine, notwithstanding its several possible functions, is nevertheless comparatively simple. This machine is particularly adapted for use in small or medium sized shops in which the amount of work is not sufficient to justify the securing of separate machines for journal turning and burnishing, quartering, and crank pin turning.

We do not herein specifically claim the quartering and crank pin turning mechanism forming a part of the machine disclosed. This mechanism is presented in our application for quartering and crank pin turning machines, Serial No. 357,808, filed Feb. 11, 1920, as a division of this present application.

What we claim is:

1. In a machine for turning locomotive or car axles having the wheels in place thereon and for quartering locomotive wheels in place on their axles, the combination of a headstock, a tailstock, means for positioning and feeding a cutting tool for turning either inside or outside axle journals, a horizontal boring spindle mounted on the headstock, and a horizontal boring spindle mounted on the tailstock, the said spindles being separated by an angle of 90° measured about the wheel axis.

2. In a machine for turning locomotive or car axles having the wheels in place thereon and for quartering locomotive wheels in place on their axles, the combination of a headstock, a tailstock, a tool carriage, means for positioning the carriage for turning either inside or outside axle journals, a horizontal boring spindle mounted on the headstock, and a horizontal boring spindle mounted on the tailstock, the said spindles being separated by an angle of 90° measured about the wheel axis.

3. In a machine for turning locomotive or car axles having the wheels in place thereon, the combination of a headstock, a tailstock, a tool carriage, two optionally usable supporting means for the carriage, one holding it in position for turning inside journals and the other holding it in position for turning outside journals, and power feed mechanism operable to feed the carriage when it is on either of the said supporting means.

4. In a machine for turning locomotive or car axles having the wheels in place thereon, the combination of a bed, a headstock and a tailstock each adjustable along the bed, a tool carriage, two carriage supporting means, one holding it in position for turning inside journals and the other holding it in position for turning outside journals, and power feed mechanism operable to feed the carriage when it is on either of the said supporting means.

5. In a machine for turning locomotive or car axles having the wheels in place thereon, the combination of a headstock, a tailstock, a tool carriage, two optionally usable supporting means for the carriage, one holding it in position for turning inside journals and the other holding it in position for turning outside journals, and power feed mechanism bodily movable with the carriage and operable to feed the carriage when it is on either of the said supporting means.

6. In a machine for turning locomotive or car axles having the wheels in place thereon, the combination of a headstock, a tailstock, a tool carriage, two optionally usable supporting means for the carriage, one holding it in position for turning inside journals and the other holding it in position for turning outside journals, and driving devices in fixed positions on the machine and adapted respectively for operating the feed mechanism when the carriage is on one or the other of the said supporting means.

7. In a machine for turning locomotive or car axles having the wheels in place thereon, the combination of a headstock, a tailstock, a tool carriage, two optionally usable supporting means for the carriage, one holding it in position for turning inside journals and the other holding it in position for turning outside journals, and driving devices in fixed positions on the machine and adapted respectively for operating the feed mechanism when the carriage is on one or the other of the said supporting means, each of the said driving devices including bevel gearing and a part of a separable joint.

8. In a machine for turning locomotive or car axles having the wheels in place thereon, the combination of a headstock, a tailstock, a tool carriage, a bracket having a guideway for the carriage, and two optionally usable supports for the bracket, one holding it in position to guide the carriage for turning inside journals and the other holding it in position to guide the carriage for turning outside journals.

9. In a machine for turning locomotive or car axles having the wheels in place thereon, the combination of a headstock, a tailstock, a tool carriage, a bracket having a guideway for the carriage, carriage feed mechanism connected with the bracket, two optionally usable supports for the brackets, one holding it in position for turning inside journals and the other holding it in position for turning outside journals, and power means for engaging the feed mechanism to operate it with the bracket and carriage in position on either support.

10. In a machine for turning locomotive or car axles having the wheels in place thereon, the combination of a headstock, a tailstock, two tool carriages, two brackets having registering guideways for the carriages, and two optionally usable supports for one of the brackets, one holding it in position to guide the carriages for turning inside journals and the other holding it in position to guide one of the carriages for turning outside journals.

11. In a machine for turning locomotive axles having the wheels in place thereon, the combination of a headstock comprising a rotatable face plate with a radial recess therein, a tailstock, a tool carriage, a slide radially adjustable in the recess, and a counterweight adapted to be secured to the slide.

12. In a machine for turning locomotive axles having the wheels in place thereon, the combination of a headstock comprising a rotatable face plate, a tailstock, a tool carriage, and means on the face plate at two angularly separated positions for holding and radially adjusting a counterweight.

13. In a machine for turning locomotive axles having the wheels in place thereon, the combination of a headstock comprising a rotatable face plate, a tailstock, a tool carriage, and means on the face plate at two angularly separated positions 90° apart for holding and radially adjusting a counterweight.

14. In a machine for turning locomotive axles having the wheels in place thereon, the combination of a headstock comprising a rotatable face plate having a recess therein to receive a crank pin, a tailstock, a tool carriage, and means on the face plate at two angularly separated positions for holding and radially adjusting a counterweight, the said positions being at 45°' from the recess and at opposite sides thereof.

In testimony whereof, we hereunto affix our signatures.

DANIEL H. TEAS.
AUGUSTUS WOOD